US012300415B2

(12) United States Patent
Chiyo et al.

(10) Patent No.: US 12,300,415 B2
(45) Date of Patent: May 13, 2025

(54) COIL COMPONENT

(71) Applicant: TDK CORPORATION, Tokyo (JP)

(72) Inventors: Noritaka Chiyo, Tokyo (JP); Takakazu Maruyama, Tokyo (JP); Takahiro Ohishi, Tokyo (JP); Tomohiro Moriki, Tokyo (JP); Shigeru Kaneko, Tokyo (JP)

(73) Assignee: TDK CORPORATION, Tokyo (JP)

( * ) Notice: Subject to any disclaimer, the term of this patent is extended or adjusted under 35 U.S.C. 154(b) by 969 days.

(21) Appl. No.: 17/018,455

(22) Filed: Sep. 11, 2020

(65) Prior Publication Data

US 2021/0110963 A1 Apr. 15, 2021

(30) Foreign Application Priority Data

Oct. 2, 2019 (JP) ................................ 2019-182319

(51) Int. Cl.
*H01F 27/28* (2006.01)
*H01F 27/34* (2006.01)

(52) U.S. Cl.
CPC ......... *H01F 27/2804* (2013.01); *H01F 27/34* (2013.01); *H01F 2027/348* (2013.01)

(58) Field of Classification Search
CPC ......... H01F 27/2804; H01F 2027/2809; H01F 17/0013; H01F 17/0006; H01F 5/003; H01F 27/34; H01F 2027/348
USPC .................................................. 336/200, 232
See application file for complete search history.

(56) References Cited

U.S. PATENT DOCUMENTS

| | | | | |
|---|---|---|---|---|
| 2009/0309579 A1* | 12/2009 | Cochran | ................ | A61B 5/113 324/207.16 |
| 2009/0322458 A1* | 12/2009 | Lee | ..................... | H01F 17/0006 335/299 |
| 2018/0358174 A1 | 12/2018 | Komachi | | |

FOREIGN PATENT DOCUMENTS

| | | | | | |
|---|---|---|---|---|---|
| CN | 106684071 A | * | 5/2017 | ............. | H01L 28/10 |
| CN | 109411210 A | * | 3/2019 | ............. | H01F 27/28 |
| CN | 109887724 A | * | 6/2019 | ......... | H01F 27/2804 |
| CN | 110289156 A | * | 9/2019 | ......... | H01F 27/2804 |
| JP | 08191014 A | * | 7/1996 | | |
| JP | H08203739 A | | 8/1996 | | |
| JP | 2019003993 A | | 1/2019 | | |
| WO | WO-9843258 A2 | * | 10/1998 | ......... | H01F 17/0006 |

* cited by examiner

*Primary Examiner* — Tszfung J Chan
(74) *Attorney, Agent, or Firm* — YOUNG LAW FIRM, P.C.

(57) ABSTRACT

Disclosed herein is a coil component that includes a substrate having a first surface, and a first coil pattern formed on the first surface of the substrate. The first coil pattern includes a plurality of turns having an innermost turn and an outermost turn. Each of the innermost and outermost turns is radially divided into a plurality of lines. The innermost turn is greater in a number of lines than the outermost turn.

4 Claims, 12 Drawing Sheets

COIL COMPONENT

BACKGROUND OF THE INVENTION

Field of the Invention

The present invention relates to a coil component and, more particularly, to a coil component having a spiral-shaped coil pattern formed on a substrate.

Description of Related Art

As coil components used in various electronic devices, there are known coil components of a type obtained by winding a wire (coated conductive wire) around a magnetic core and coil components of a type obtained by forming a plurality of turns of a spiral-shaped coil pattern on the surface of a substrate. For example, JP H8-203739A discloses a coil component having a configuration in which a spiral-shaped coil pattern is formed on the surface of an insulating substrate and is radially divided into three parts by spiral-shaped slits. By thus dividing the coil pattern with a spiral-shaped slit, uneven distribution of current density is reduced, allowing reduction in a DC resistance and an AC resistance. However, in the invention disclosed in JP H8-203739A, there occurs a significant difference in electric length between lines positioned on the inner and outer peripheral sides of the coil pattern, resulting in increase in an AC resistance.

On the other hand, in a coil component described in JP 2019-003993A, spiral-shaped coil patterns are formed respectively on both surfaces of a substrate, and turns constituting each coil patterns are radially divided into two lines by a spiral-shaped slit, wherein a line positioned on the inner peripheral side in one coil pattern is connected to a line positioned on the outer peripheral side in the other coil pattern, and a line positioned on the peripheral side in the one coil pattern is connected to a line positioned on the inner peripheral side in the other coil pattern. This cancels a difference between dimensions of inner and outer peripheries, thereby allowing reduction in the AC resistance. However, an optimum pattern shape differs between the inner and outer peripheral sides of the coil pattern, so that when the number of lines constituting each turn is constant as in the invention described in JP 2019-003993A, optimum characteristics are difficult to obtain.

U.S. Pat. No. 8,866,259 discloses a configuration in which a spiral-shaped planar conductor is partially divided into a plurality of lines (see FIG. 6). As a result, a turn (see reference numeral 202 in FIG. 6) constituted of one line and a turn (see reference numeral 212 in FIG. 6) constituted of two lines co-exist in one coil pattern.

However, in the invention disclosed in U.S. Pat. No. 8,866,259, one (reference numeral **212*a* in FIG. 6) of the two lines constituting one coil pattern is connected to a conductor plug (reference numeral 206*a* in FIG. 6) at the inner peripheral end and is thus connected, through the conductor plug, to two lines (reference numerals 211*a* and 211*b* in FIG. 7) constituting another coil pattern. Thus, a current flow from the conductor plug is biased to the inner line (211*b* in FIG. 7**) of the two lines.

SUMMARY

It is therefore an object of the present invention to provide a coil component having a configuration in which a spiral-shaped planar conductor is divided into a plurality of lines by a spiral-shaped slit, capable of reducing uneven distribution of current density and achieving much better coil characteristics by making the pattern shape of a coil pattern different between the inner peripheral side and the outer peripheral side.

A coil component according to the present invention includes: a substrate; a first coil pattern formed on one surface of the substrate and spirally wound in a plurality of turns; and a second coil pattern formed on the other surface of the substrate and spirally wound in a plurality of turns. The first coil pattern includes a first line and second and third lines positioned on the inner peripheral side than the first line and branching from the first line. The second coil pattern includes a fourth line and fifth and sixth lines positioned on the inner peripheral side than the fourth line and branching from the fourth line. The third line is positioned on the inner peripheral side than the second line, and the sixth line is positioned on the inner peripheral side than the fifth line. The inner peripheral end of the second line is connected to the inner peripheral end of the sixth line through a first connection part formed so as to penetrate the substrate, and the inner peripheral end of the third line is connected to the inner peripheral end of the fifth line through a second connection part formed so as to penetrate the substrate.

According to the present invention, the first and second coil patterns each branch in the middle, so that the number of lines on the inner peripheral side can selectively be increased. Thus, influence of eddy current can be reduced on the inner peripheral side, and reduction in pattern width by a slit required for branching can be suppressed on the outer peripheral side. In addition, the second line positioned on the outer peripheral side is connected to the sixth line positioned on the inner peripheral side, and the third line positioned on the inner peripheral side is connected to the fifth line positioned on the outer peripheral side, whereby a difference between dimensions of inner and outer peripheries is canceled, making it possible to reduce uneven distribution of current density.

In the present invention, the second, third, fifth, and sixth lines may be smaller in pattern width than the first and fourth lines. Thus, it is possible to further reduce the influence of eddy current on the inner peripheral side and to ensure a sufficient pattern width on the outer peripheral side.

In the present invention, the second, third, fifth, and sixth lines may be smaller in pattern thickness than the first and fourth lines. Thus, it is possible to still further reduce the influence of eddy current on the inner peripheral side and to ensure a sufficient pattern sectional area on the outer peripheral side.

In the present invention, the outermost turn of the first coil pattern may be radially divided into a plurality of lines including the first line by a spiral-shaped slit, and the outermost turn of the second coil pattern may be radially divided into a plurality of lines including the fourth line by a spiral-shaped slit. This can reduce the influence of eddy current on the outer peripheral side.

In the present invention, the first line may be continuously increased in pattern width toward a portion at which it branches into the second and third lines, and the fourth line may be continuously increased in pattern width toward a portion at which it branches into the fifth and sixth lines. With this configuration, it is possible to maintain smoothness of the pattern shape of a line adjacent to the branching portion of the first line.

As described above, according to the present invention, it is possible to reduce uneven distribution of current density. Further, it is possible to reduce influence of eddy current on the inner peripheral side and to suppress reduction in pattern width by the slit on the outer peripheral side.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

Hereinafter, a preferred embodiment of the present invention will be described in detail with reference to the accompanying drawings.

Figure 1:
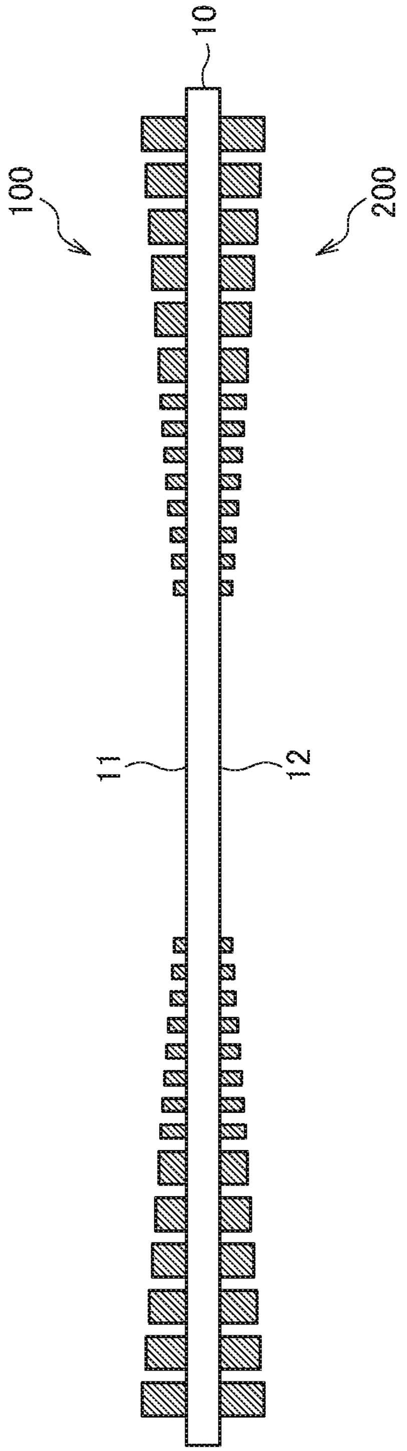
FIG. 1 is a schematic cross-sectional view illustrating the configuration of a coil component according to an embodiment of the present invention.

FIG. 1 is a schematic cross-sectional view illustrating the configuration of a coil component according to an embodiment of the present invention.

As illustrated in FIG. 1, the coil component according to the present embodiment includes a substrate 10, a first coil pattern 100 formed on one surface 11 of the substrate 10, and a second coil pattern 200 formed on the other surface 12 of the substrate 10. Although details will be described later, the inner peripheral end of the first coil pattern 100 and the inner peripheral end of the second coil pattern 200 are connected to each other through a plurality of connection parts 301 to 304 (not illustrated in the cross-section of FIG. 1) formed so as to penetrate the substrate 10.

There is no particular restriction on the material of the substrate 10, and a transparent or translucent flexible insulating material such as PET resin may be used. Alternatively, the substrate 10 may be a flexible substrate obtained by impregnating glass cloth with epoxy-based resin.

Figure 2:
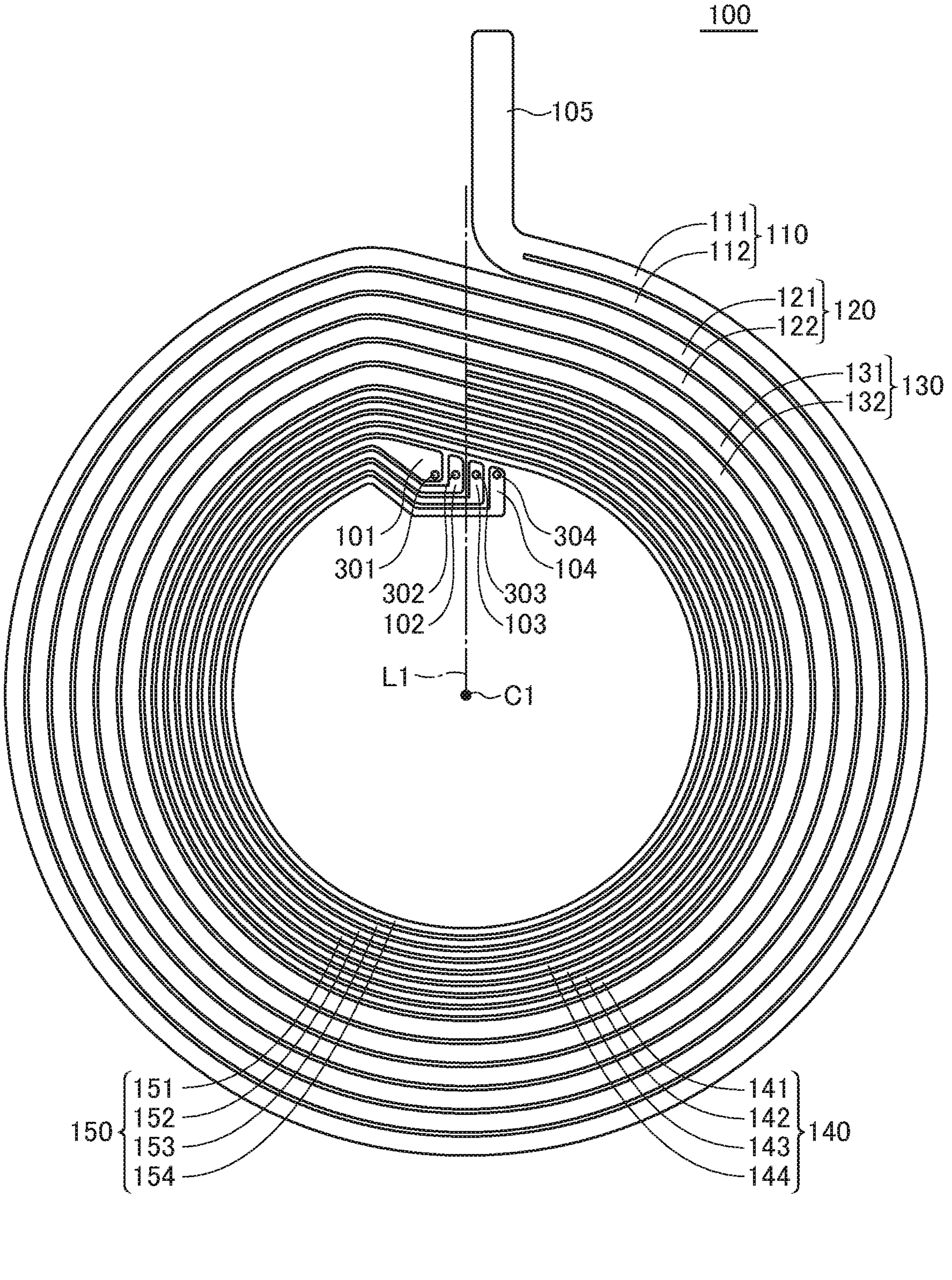
FIG. 2 is a plan view for explaining the pattern shape of a first coil pattern 100.

FIG. 2 is a plan view for explaining the pattern shape of the first coil pattern 100 as viewed from the side of the surface 11 of the substrate 10.

As illustrated in FIG. 2, the first coil pattern 100 has a five-turn configuration constituted of turns 110, 120, 130, 140, and 150, in which the turn 110 is the outermost turn positioned at the outermost periphery, and the turn 150 is the innermost turn positioned at the innermost periphery. Of the turns 110, 120, 130, 140, and 150, the turns 110, 120, and 130 positioned on the outer peripheral side are each radially divided into two parts by a spiral-shaped slit. Specifically, the turn 110 is divided into two lines 111 and 112, the turn 120 is divided into two lines 121 and 122, and the turn 130 is divided into two lines 131 and 132. The lines 111, 121, and 131 are positioned outside the lines 112, 122, and 132, respectively. The turns 140 and 150 positioned on the inner peripheral side are each radially divided into four parts by three spiral-shaped slits. Specifically, the turn 140 is divided into four lines 141 to 144, and the turn 150 is divided into four lines 151 to 154. The lines 141 and 151 are each the outermost line positioned on the outermost peripheral side in its corresponding turn, the lines 142 and 152 are each the second outermost line which is the second line counted from the outermost line in its corresponding turn, the lines 143 and 153 are each the second innermost line which is the second line counted from the innermost line in its corresponding turn, and the lines 144 and 154 are each the innermost line positioned on the innermost peripheral side in its corresponding turn.

The number of divisions changes at the boundary between the turns 130 and 140. Specifically, the line 131 constituting the turn 130 is divided into two lines 141 and 142 at the boundary, and the line 132 constituting the turn 130 is divided into two lines 143 and 144 at the boundary.

An outer peripheral end 105 of the first coil pattern 100 is radially led out. The first coil pattern 100 has four inner peripheral ends. That is, the first coil pattern 100 has an inner peripheral end 101 which is the end of the line 151, an inner peripheral end 102 which is the end of the line 152, an inner peripheral end 103 which is the end of the line 153, and an inner peripheral end 104 which is the end of the line 154. The above inner peripheral ends 101 to 104 are connected to connection parts 301 to 304, respectively.

Figure 3:
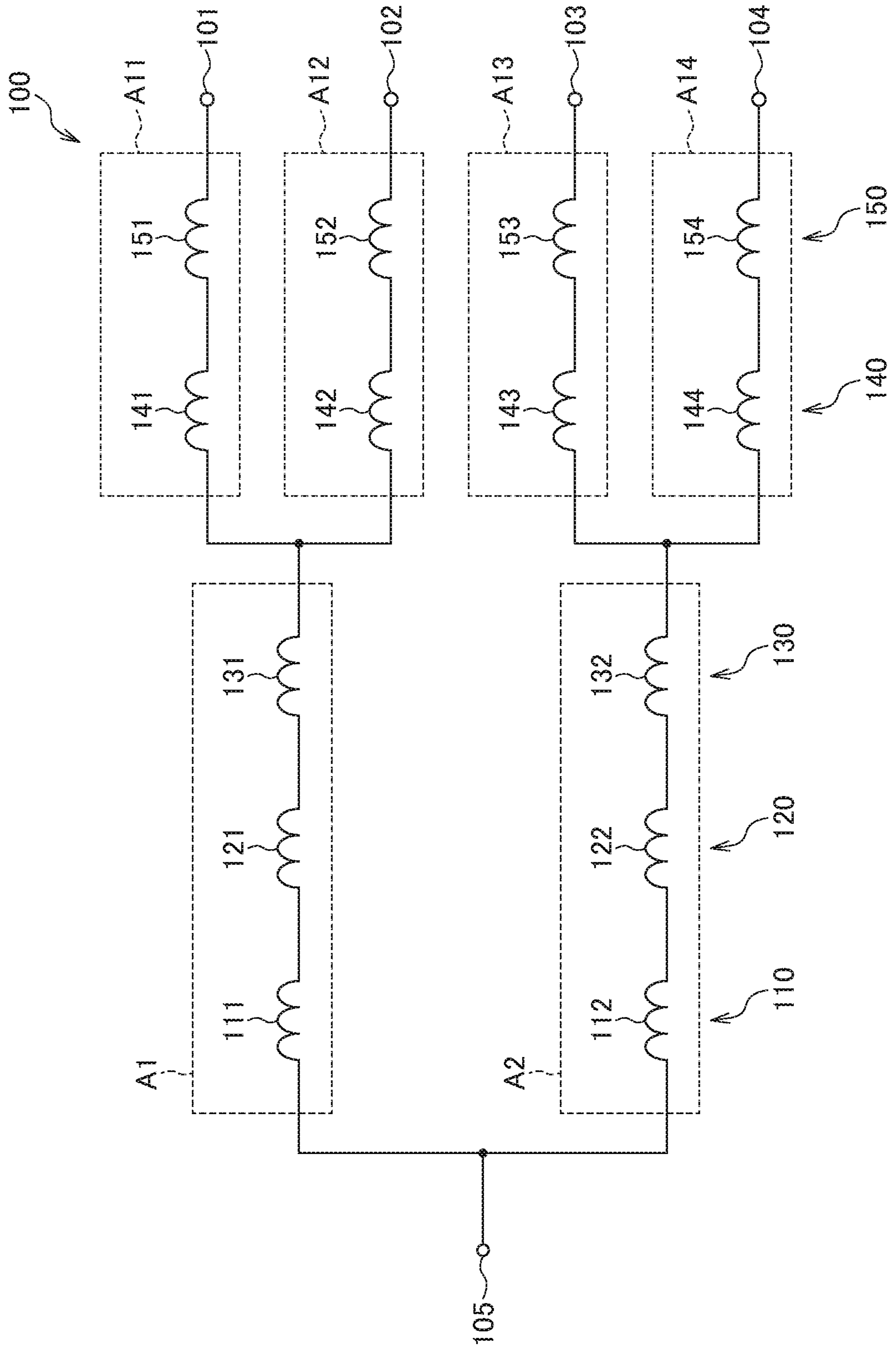
FIG. 3 is an equivalent circuit diagram of the first coil pattern 100.

Thus, as illustrated in FIG. 3, a division pattern A1 constituted of the lines 111, 121, and 131 branches into a division pattern A11 constituted of the lines 141 and 151 and a division pattern A12 constituted of the lines 142 and 152, and a division pattern A2 constituted of the lines 112, 122, and 132 branches into a division pattern A13 constituted of the lines 143 and 153 and a division pattern A14 constituted of the lines 144 and 154. As described above, the first coil pattern 100 increases in the number of division patterns by branching from the outer peripheral end 105 toward the inner peripheral ends 101 to 104. That is, the first coil pattern 100 has a single pattern at the outer peripheral end 105, and it branches into two division patterns A1 and A2 in the turns 110, 120, and 130 and further into four division patterns A11 to A14 in the turns 140 and 150. The plurality of division patterns that have once branched from the outer peripheral end preferably extend toward the inner peripheral end without merging with each other in the plane. This is because when the plurality of division patterns that have once branched are merged again in the plane, current concentrates on the merging portion to cause uneven distribution of current density.

As illustrated in FIG. 2, when a virtual line L1 radially extending from a center point C1 of the first coil pattern 100 is drawn, the connection parts 301 and 304 are disposed at symmetrical positions with respect to the virtual line L1, and the connection parts 302 and 303 are disposed at symmetrical positions with respect to the virtual line L1.

Figure 4:
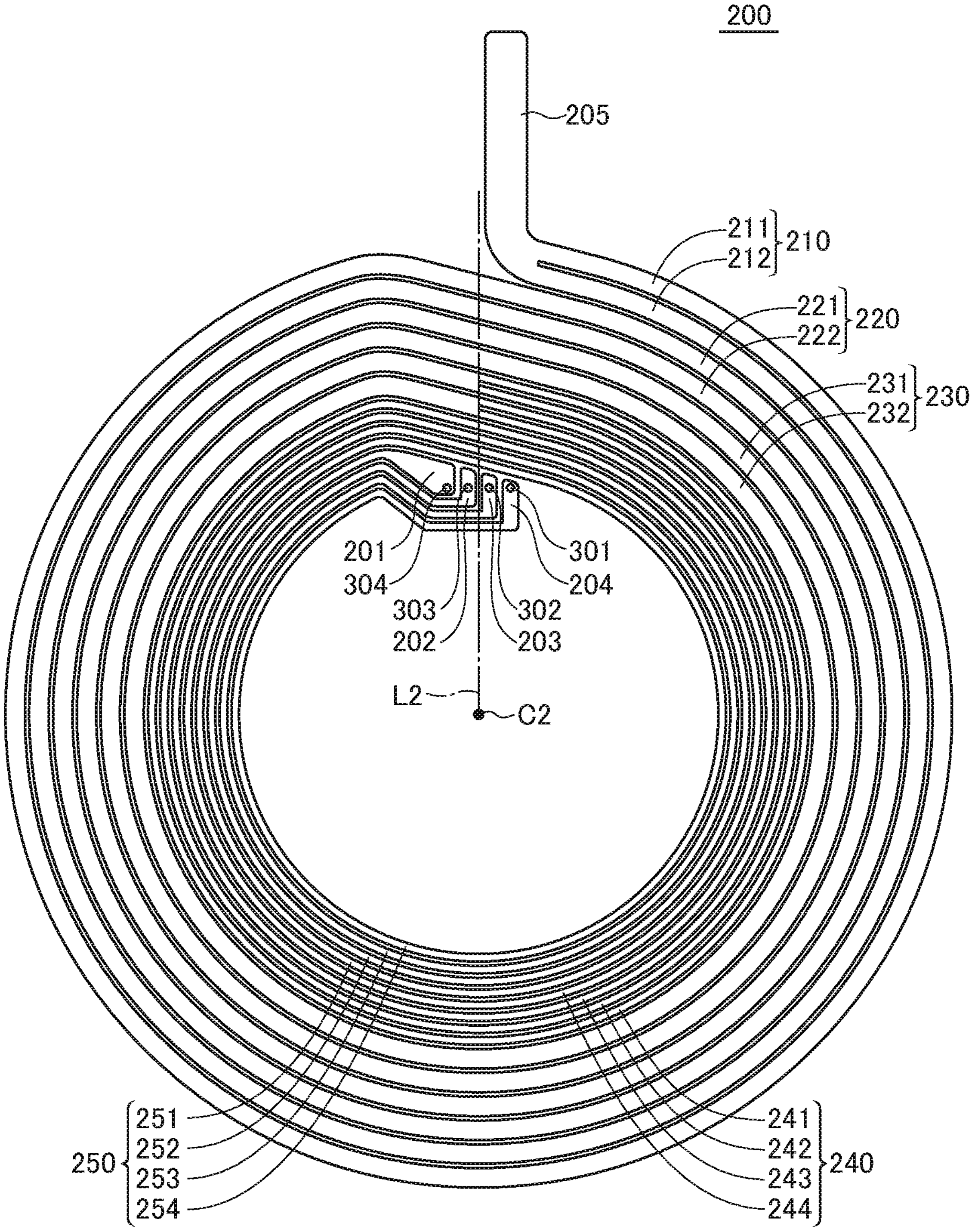
FIG. 4 is a plan view for explaining the pattern shape of a second coil pattern 200.

FIG. 4 is a plan view for explaining the pattern shape of the second coil pattern 200 as viewed from the side of the surface 12 of the substrate 10.

As illustrated in FIG. 4, the pattern shape of the second coil pattern 200 is the same as that of the first coil pattern 100. Thus, the first and second coil patterns 100 and 200 can be produced using the same mask, allowing a significant reduction in manufacturing cost.

The second coil pattern 200 has a five-turn configuration constituted of turns 210, 220, 230, 240, and 250, in which the turn 210 is the outermost turn positioned at the outermost periphery, and the turn 250 is the innermost turn positioned at the innermost periphery. Of the turns 210, 220, 230, 240, and 250, the turns 210, 220, and 230 positioned on the outer peripheral side are each radially divided into two parts by a spiral-shaped slit. Specifically, the turn 210 is divided into two lines 211 and 212, the turn 220 is divided into two lines 221 and 222, and the turn 230 is divided into two lines 231 and 232. The lines 211, 221, and 231 are positioned outside the lines 212, 222, and 232, respectively. The turns 240 and 250 positioned on the inner peripheral side are each radially divided into four parts by three spiral-shaped slits. Specifically, the turn 240 is divided into four lines 241 to 244, and the turn 250 is divided into four lines 251 to 254. The lines 241 and 251 are each the outermost line positioned on the outermost peripheral side in its corresponding turn, the lines 242 and 252 are each the second outermost line which is the second line counted from the outermost line in its corresponding turn, the lines 243 and 253 are each the second innermost turn which is the second line counted from the innermost line in its corresponding turn, and the lines 244 and 254 are each the innermost line positioned on the innermost peripheral side in its corresponding turn.

The number of divisions changes at the boundary between the turns 230 and 240. Specifically, the line 231 constituting the turn 230 is divided into two lines 241 and 242 at the boundary, and the line 232 constituting the turn 230 is divided into two lines 243 and 244 at the boundary.

An outer peripheral end 205 of the second coil pattern 200 is radially led. The second coil pattern 200 has four inner peripheral ends. That is, the second coil pattern 200 has an inner peripheral end 201 which is the end of the line 251, an inner peripheral end 202 which is the end of the line 252, an inner peripheral end 203 which is the end of the line 253, and an inner peripheral end 204 which is the end of the line 254. The above inner peripheral ends 201 to 204 are connected to connection parts 304, 303, 302, and 301, respectively.

Figure 5:
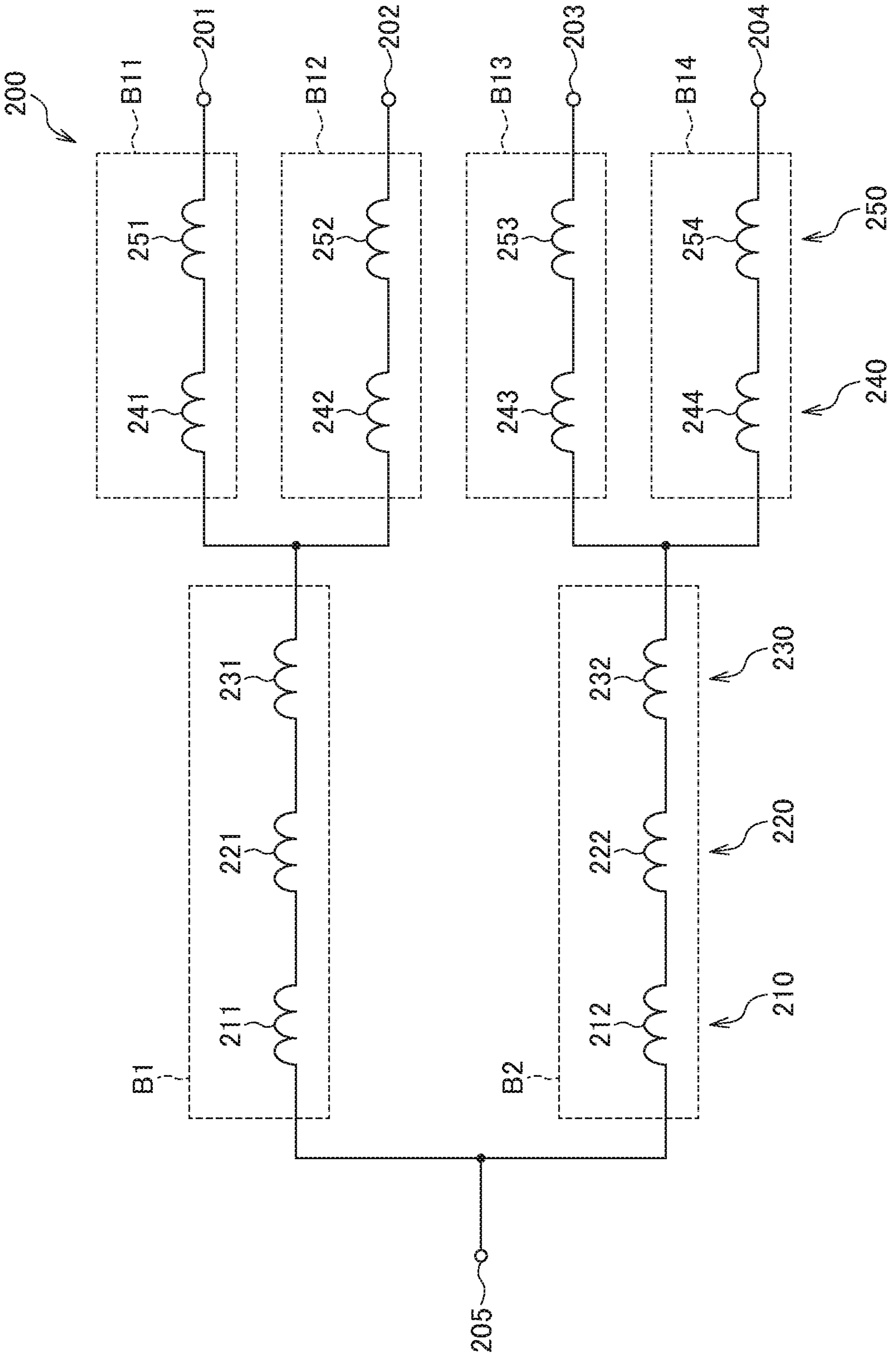
FIG. 5 is an equivalent circuit diagram of the second coil pattern 200.

Thus, as illustrated in FIG. 5, a division pattern B1 constituted of the lines 211, 221, and 231 branches into a division pattern B11 constituted of the lines 241 and 251 and a division pattern B12 constituted of the lines 242 and 252, and a division pattern B2 constituted of the lines 212, 222, and 232 branches into a division pattern B13 constituted of the lines 243 and 253 and a division pattern B14 constituted of the lines 244 and 254. As described above, the second coil pattern 200 increases in the number of division patterns by branching from the outer peripheral end 205 toward the inner peripheral ends 201 to 204. That is, the second coil pattern 200 has a single pattern at the outer peripheral end 205, and it branches into two division patterns B1 and B2 in the turns 210, 220, and 230 and further into four division patterns B11 to B14 in the turns 240 and 250.

As illustrated in FIG. 4, when a virtual line L2 radially extending from a center point C2 of the second coil pattern 200 is drawn, the connection parts 301 and 304 are disposed at symmetrical positions with respect to the virtual line L2, and the connection parts 302 and 303 are disposed at symmetrical positions with respect to the virtual line L2.

Figure 6:
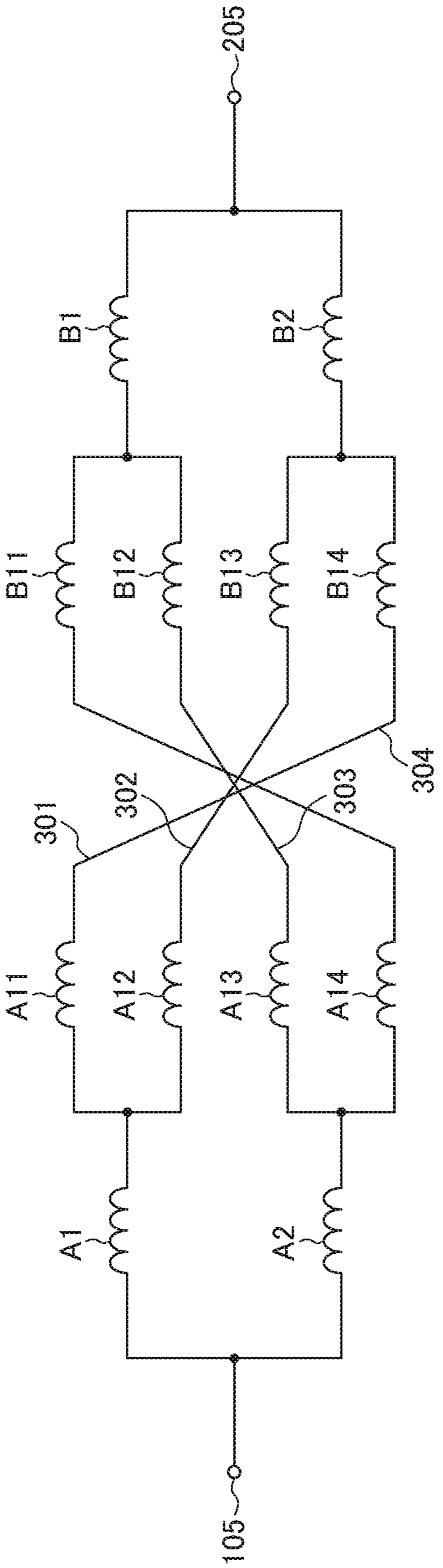
FIG. 6 is an equivalent circuit diagram of the coil component according to the embodiment of the present invention.

The thus configured first and second coil patterns 100 and 200 are formed on the front and back surfaces of the substrate 10 such that the center points C1 and C2 overlap each other and that the virtual lines L1 and L2 overlap each other. As a result, as illustrated in FIG. 6, the first coil pattern 100 and the second coil pattern 200 are connected in series through the connection parts 301 to 304 to thereby form a spiral coil having 10 turns in total. The division patterns A11, A12, A13, and A14 are connected to the division patterns B14, B13, B12, and B11, respectively. That is, the outermost division pattern A11 is connected to the innermost division pattern B14, the second outermost division pattern A12 is connected to the second innermost division pattern B13, the second innermost division pattern A13 is connected to the second outermost division pattern B12, and the innermost division pattern A14 is connected to the outermost division pattern B11. Thus, a difference between dimensions of inner and outer peripheries is canceled, making it possible to reduce the DC and AC resistance.

Further, in the present embodiment, the lines 141 to 144, 151 to 154, 241 to 244, and 251 to 254 of the turns 140, 150, 240, and 250 positioned on the inner peripheral side and each having the four division lines are smaller in pattern width than the lines 111, 112, 121, 122, 131, 132, 211, 212, 221, 222, 231, and 232 of the turns 110 to 130 and 210 to 230 positioned on the outer peripheral side and each having the two division lines. Thus, in the present embodiment, the number of divisions of the turn on the inner peripheral side is increased to reduce the pattern width of each line, thereby making it possible to reduce a loss on the inner peripheral side having a strong magnetic field and thus having a large heat generation due to eddy current. On the other hand, the number of divisions of the turn on the outer peripheral side is small, making it possible to suppress reduction in the pattern width by the slit required for the division. The term "pattern width" used herein refers to the width of the planar conductor in the radial direction.

Figure 7:
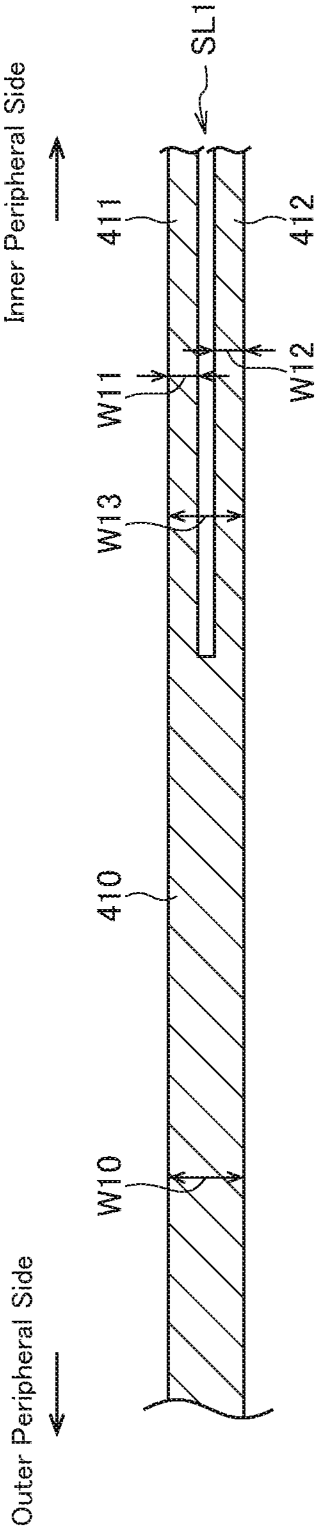
FIG. 7 is a schematic view for explaining a first example of the pattern shape before and after division.

As illustrated in FIG. 7, a pattern width W10 of a line 410 before division may be larger than each of pattern widths W11 and W12 of lines 411 and 412 after division and may be the same as a total width W13 of the lines 411, 412 and a slit SL1. Thus, the width of the illustrated turn in the radial direction does not change before and after division, thus facilitating pattern layout.

Figure 8:
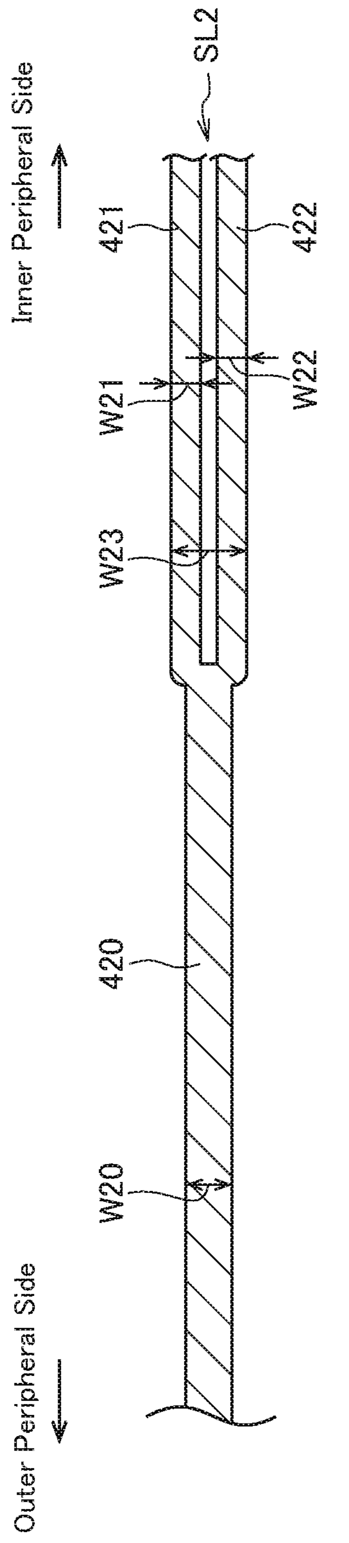
FIG. 8 is a schematic view for explaining a second example of the pattern shape before and after division.

Alternatively, as illustrated in FIG. 8, a pattern width W20 of a line 420 before division may be larger than each of pattern widths W21 and W22 of lines 421 and 422 after division and may be smaller than a total width W23 of the lines 421, 422 and a slit SL2. In this case, the pattern width W20 may be the same as the total value of the pattern widths W21 and W22. Thus, the pattern width does not significantly change before and after division, thereby achieving a high degree of evenness in current density distribution.

Figure 9:
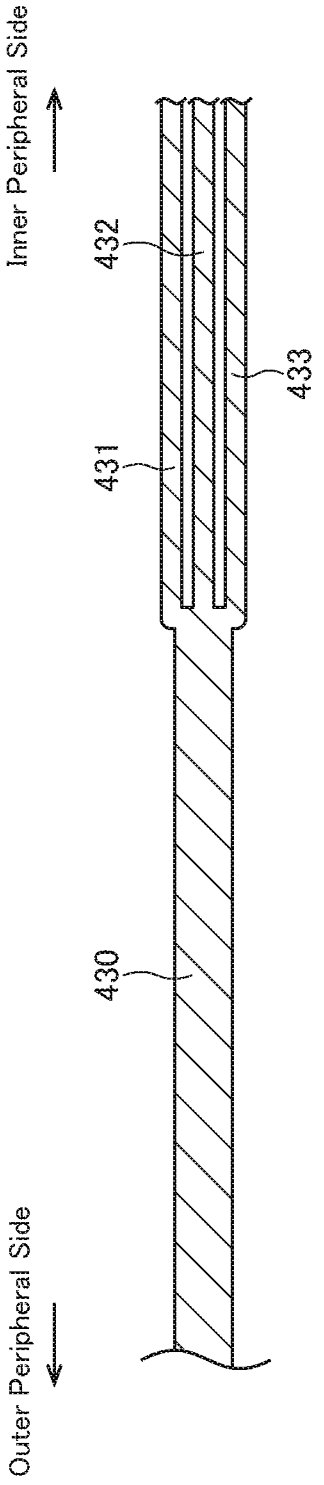
FIG. 9 is a schematic view for explaining a third example of the pattern shape before and after division.
Figure 10:
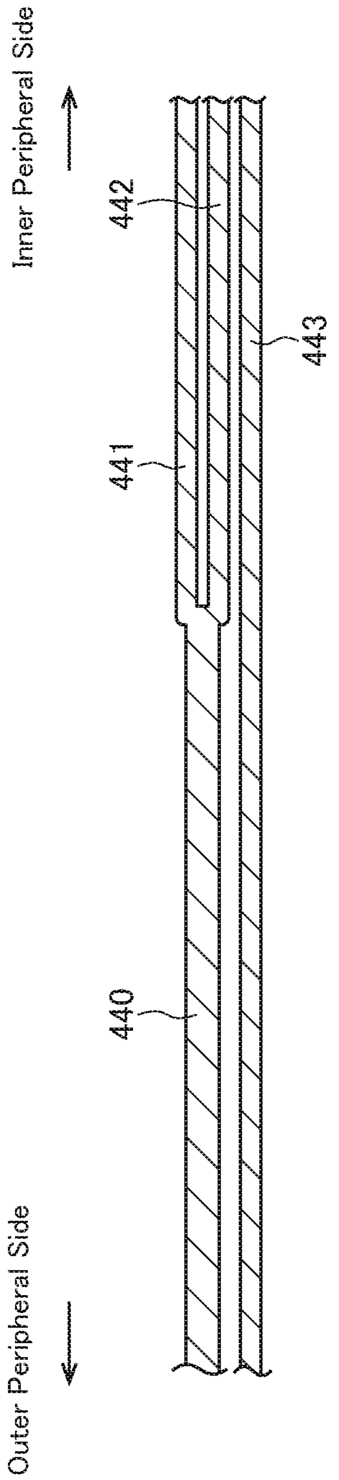
FIG. 10 is a schematic view for explaining a fourth example of the pattern shape before and after division.
Figure 11:
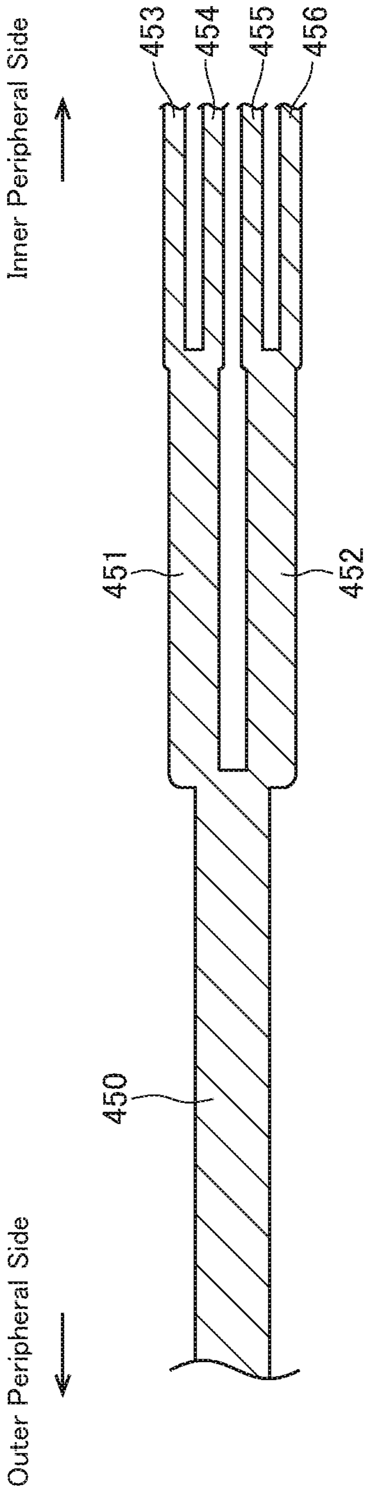
FIG. 11 is a schematic view for explaining a fifth example of the pattern shape before and after division.

Further, the division number of one line is not limited to two and, as illustrated in FIG. 9, one line 430 may be divided into three lines 431 to 433. Further, a configuration as illustrated in FIG. 10 may be possible. In this example, only a line 440 is divided into two lines 441 and 442, while a line 443 is not divided. As a result, one turn, which is constituted of two lines 440 and 443 before division, is constituted of three lines 441 to 443 after division. That is, when a given turn is constituted of a plurality of lines, not all the plurality of lines need to be divided, but there may be any line (line 443 in the example of FIG. 10) that is not divided. Furthermore, a configuration as illustrated in FIG. 11 may be possible, in which one line 450 is divided into two lines (451 and 452), and the obtained lines 451 and 452 are each further divided into two lines (453 and 454, 455 and 456). That is, the coil pattern may be hierarchically divided at a plurality of portions.

Figure 12:
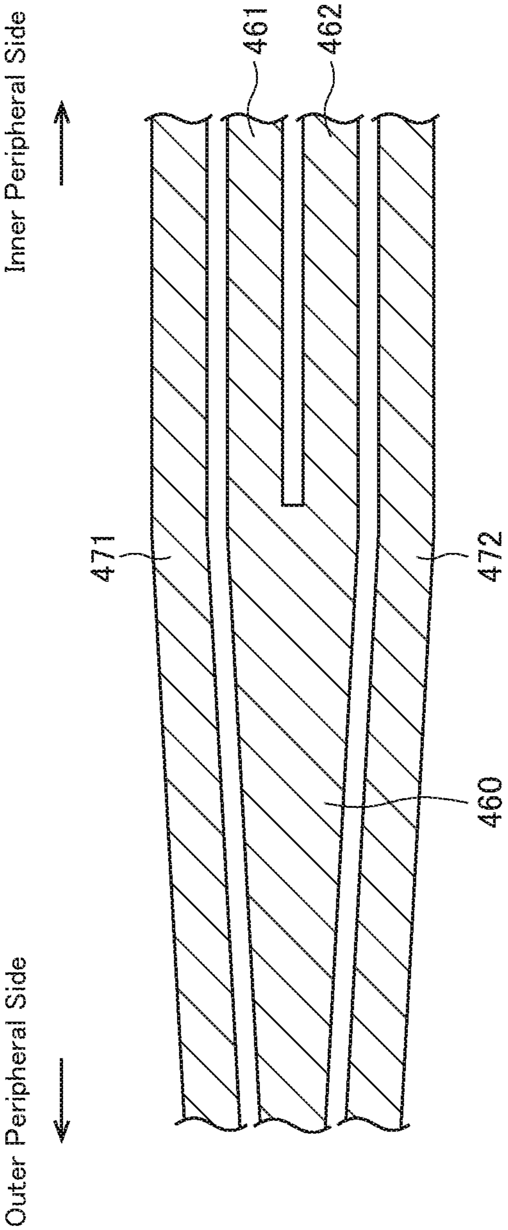
FIG. 12 is a schematic view for explaining a sixth example of the pattern shape before and after division.

Further, as illustrated in FIG. 12, a line 460 may be continuously increased in pattern width toward a portion at which it branches into lines 461 and 462. With this configuration, it is possible to maintain smoothness of the pattern shape while keeping a space between the line 460 (461) and a line 471 and a space between the line 460 (462) and a line 472 substantially constant.

Further, as illustrated in FIG. 1, the pattern thickness of each of the coil patterns 100 and 200 may be smaller in the innermost turn than in the outermost turn. Particularly, the pattern thickness is preferably reduced gradually or stepwise from the outermost turn toward the innermost turn. With this configuration, a loss reduction effect obtained by reducing the pattern width becomes remarkable on the inner peripheral side which is affected more strongly by eddy current.

As described above, in the coil component according to the present embodiment, the turns constituting the first and second coil patterns 100 and 200 are each radially divided into a plurality of parts by the spiral-shaped slit (or slits), so that, as compared to a case where such a slit is not formed, uneven distribution of current density can be reduced. As a result, even when the coil component according to the present embodiment constitutes, for example, a power receiving coil of a wireless power transmission device and thus requires a large current, a DC resistance and an AC resistance can be reduced. In addition, the number of divisions of each of the first and second coil patterns 100 and 200 is two on the outer peripheral side and four on the inner peripheral side, so that it is possible to reduce a loss on the inner peripheral side having a strong magnetic field and thus having a large heat generation due to eddy current. On the other hand, the number of divisions on the outer peripheral side is small, making it possible to suppress reduction in the pattern width by the slit.

It is apparent that the present invention is not limited to the above embodiments, but may be modified and changed without departing from the scope and spirit of the invention.

For example, in the above embodiment, the turns 110 to 130 and 210 to 230 positioned on the outer peripheral side are each divided into two lines; however, this point is not essential in the present invention, and the turns positioned on the outer peripheral side each may not necessarily be divided into a plurality of lines.

What is claimed is:

1. A coil component comprising:

a substrate having first and second surfaces;

a first coil pattern formed on the first surface of the substrate and spirally wound in a plurality of turns; and a second coil pattern formed on the second surface of the substrate and spirally wound in a plurality of turns, wherein the plurality of turns of the first coil pattern includes a first turn including an outermost turn, a second turn including an innermost turn, and a third turn positioned between the first turn and the second turn, wherein the plurality of turns of the second coil pattern includes a fourth turn including an outermost turn, a fifth turn including an innermost turn, and a sixth turn positioned between the fourth and the fifth turn, wherein the first turn is radially divided into a plurality of lines including a first line and a seventh line by a spiral-shaped slit, wherein the second turn is radially divided into a plurality of lines including a second line, a third line, and an eighth line by a spiral-shaped slit, wherein the third turn includes a first branch point from the first line to the second and third lines, wherein the fourth turn is radially divided into a plurality of lines including a fourth line and a ninth line by a spiral-shaped slit, wherein the fifth turn is radially divided into a plurality of lines including a fifth line, a sixth line, and a tenth line by a spiral-shaped slit, wherein the sixth turn includes a second branch point from the fourth line to the fifth and sixth lines, wherein the first line is isolated from the seventh and eighth lines at least on the second and third turns, wherein the fourth line is isolated from the ninth and tenth lines at least on the fourth and fifth turns, wherein the third line is positioned on an inner peripheral side than the second line, wherein the sixth line is positioned on an inner peripheral side than the fifth line, wherein an inner peripheral end of the second line is connected to an inner peripheral end of the sixth line through a first connection part formed so as to penetrate the substrate, and wherein an inner peripheral end of the third line is connected to an inner peripheral end of the fifth line through a second connection part formed so as to penetrate the substrate.

2. The coil component as claimed in claim 1, wherein the second, third, fifth, and sixth lines are smaller in pattern width than the first and fourth lines.

3. The coil component as claimed in claim 1, wherein the second, third, fifth, and sixth lines are smaller in pattern thickness than the first and fourth lines.

4. A coil component comprising:

a substrate having first and second surfaces;

a first coil pattern formed on the first surface of the substrate and spirally wound in a plurality of turns; and a second coil pattern formed on the second surface of the substrate and spirally wound in a plurality of turns, wherein the first coil pattern includes a first line and second and third lines positioned on an inner peripheral side than the first line and branching from the first line, wherein the second coil pattern includes a fourth line and fifth and sixth lines positioned on an inner peripheral side than the fourth line and branching from the fourth line, wherein the third line is positioned on an inner peripheral side than the second line, wherein the sixth line is positioned on an inner peripheral side than the fifth line, wherein an inner peripheral end of the second line is connected to an inner peripheral end of the sixth line through a first connection part formed so as to penetrate the substrate, wherein an inner peripheral end of the third line is connected to an inner peripheral end of the fifth line through a second connection part formed so as to penetrate the substrate, wherein the first line is continuously increased in pattern width toward a portion at which the first line branches into the second and third lines, and wherein the fourth line is continuously increased in pattern width toward a portion at which the fourth line branches into the fifth and sixth lines.

* * * * *